United States Patent
Dorfman et al.

(10) Patent No.: US 9,923,885 B2
(45) Date of Patent: *Mar. 20, 2018

(54) SYSTEMS AND METHODS FOR USING IMAGING TO AUTHENTICATE ONLINE USERS

(71) Applicant: Oath Inc., Dulles, VA (US)

(72) Inventors: Scott Dorfman, Reston, VA (US); Donald P. Sengpiehl, Round Hill, VA (US)

(73) Assignee: Oath Inc., Dulles, VA (US)

( * ) Notice: Subject to any disclaimer, the term of this patent is extended or adjusted under 35 U.S.C. 154(b) by 200 days.

This patent is subject to a terminal disclaimer.

(21) Appl. No.: 14/813,214

(22) Filed: Jul. 30, 2015

(65) Prior Publication Data

US 2015/0341344 A1 Nov. 26, 2015

Related U.S. Application Data

(63) Continuation of application No. 13/840,839, filed on Mar. 15, 2013, now Pat. No. 9,130,929.

(51) Int. Cl.
*H04L 29/06* (2006.01)
*G06F 21/33* (2013.01)
(Continued)

(52) U.S. Cl.
CPC .......... *H04L 63/0823* (2013.01); *G06F 21/32* (2013.01); *G06F 21/33* (2013.01);
(Continued)

(58) Field of Classification Search
None
See application file for complete search history.

(56) References Cited

U.S. PATENT DOCUMENTS 7,314,167 B1   1/2008   Kiliccote
8,256,664 B1*  9/2012   Balfanz .................. H04L 63/08
                                                                    235/375
(Continued)

FOREIGN PATENT DOCUMENTS

WO   WO-2012/135563 A1   10/2012

OTHER PUBLICATIONS

Acker et al., Mobile Call Authentication using Near Field Communication-based Smart Cards for Proff of Identity towards a Company, © 2013, ACM, 5 pages.*

(Continued)

*Primary Examiner* — Jeffrey Pwu
*Assistant Examiner* — Baotram Tran
(74) *Attorney, Agent, or Firm* — Bookoff McAndrews, PLLC

(57) ABSTRACT

Systems and methods are disclosed for authenticating an identity of an online user. One method includes receiving from the user, through a first device, a request to access a web page associated with the user's online account; transmitting to the user an image that contains a unique ID and a URL of an authentication server; and receiving from the user, through the first device, an authentication request containing the unique ID. The method also includes receiving from the user, through a second device, a log-in ID associated with the user and the unique ID; and authenticating the identity of the user to grant the user access, through the first device, to the web page associated with the user's online account.

19 Claims, 6 Drawing Sheets

(51) Int. Cl.
| | |
|---|---|
| G06F 21/32 | (2013.01) |
| G06F 21/43 | (2013.01) |
| G06Q 20/32 | (2012.01) |
| H04W 12/06 | (2009.01) |
| G06F 21/36 | (2013.01) |
| G06Q 20/40 | (2012.01) |
| G06Q 20/42 | (2012.01) |
| G06F 21/35 | (2013.01) |

(52) U.S. Cl.
CPC ............ *G06F 21/335* (2013.01); *G06F 21/35* (2013.01); *G06F 21/36* (2013.01); *G06F 21/43* (2013.01); *G06Q 20/3276* (2013.01); *G06Q 20/40* (2013.01); *G06Q 20/425* (2013.01); *H04L 63/0853* (2013.01); *H04L 63/0861* (2013.01); *H04L 63/18* (2013.01); *H04W 12/06* (2013.01); *G06F 2221/2117* (2013.01)

(56) References Cited

U.S. PATENT DOCUMENTS

| | | | | |
|---|---|---|---|---|
| 8,925,058 | B1* | 12/2014 | Dotan | G06F 21/31 |
| | | | | 713/186 |
| 9,166,969 | B2* | 10/2015 | Hershberg | H04L 63/083 |
| 2001/0025348 | A1* | 9/2001 | Takaragi | G06F 21/32 |
| | | | | 726/32 |
| 2004/0049702 | A1* | 3/2004 | Subramaniam | G06Q 20/382 |
| | | | | 726/28 |
| 2007/0266425 | A1* | 11/2007 | Cho | H04L 63/083 |
| | | | | 726/4 |
| 2008/0271122 | A1* | 10/2008 | Nolan | G06F 21/32 |
| | | | | 726/4 |
| 2009/0187980 | A1* | 7/2009 | Tung | H04L 63/0823 |
| | | | | 726/6 |
| 2010/0115607 | A1* | 5/2010 | Pratt | G06F 21/31 |
| | | | | 726/18 |
| 2010/0241857 | A1* | 9/2010 | Okude | B60R 25/24 |
| | | | | 713/168 |
| 2011/0047606 | A1* | 2/2011 | Blomquist | G06F 21/41 |
| | | | | 726/7 |
| 2011/0219427 | A1* | 9/2011 | Hito | G06F 21/00 |
| | | | | 726/3 |
| 2012/0072718 | A1* | 3/2012 | Ronda | H04L 63/0853 |
| | | | | 713/156 |
| 2012/0096067 | A1* | 4/2012 | Murai | G06F 13/385 |
| | | | | 709/203 |
| 2012/0166309 | A1 | 6/2012 | Hwang et al. | |
| 2013/0159179 | A1* | 6/2013 | Choi | G06Q 20/3674 |
| | | | | 705/41 |
| 2013/0167208 | A1* | 6/2013 | Shi | H04L 63/18 |
| | | | | 726/5 |
| 2013/0179692 | A1* | 7/2013 | Tolba | H04L 63/08 |
| | | | | 713/179 |
| 2013/0219479 | A1* | 8/2013 | DeSoto | H04W 12/06 |
| | | | | 726/6 |
| 2013/0232336 | A1* | 9/2013 | Cheung | H04L 9/006 |
| | | | | 713/156 |
| 2013/0262309 | A1* | 10/2013 | Gadotti | G06Q 20/3276 |
| | | | | 705/44 |
| 2014/0007225 | A1* | 1/2014 | Gay | G06F 21/36 |
| | | | | 726/19 |
| 2014/0040628 | A1* | 2/2014 | Fort | G06F 21/34 |
| | | | | 713/182 |
| 2014/0129834 | A1* | 5/2014 | Brill | H04L 9/321 |
| | | | | 713/168 |
| 2014/0181911 | A1* | 6/2014 | Kula | H04L 63/0853 |
| | | | | 726/4 |

OTHER PUBLICATIONS

Alpcan et al., A Lightweight Biometric Signature Scheme for User Authentication over Networks, © 2008, ACM, 6 pages.*
Farrell et al., Verinet Web—Speaker Verification for thw World Wide Web, © 2000, IEEE, 4 pages.*
Flanagan, Speech Technology and Computing: A Unique Partnership, © 1992, IEEE, 6 pages.*
Kim et al., Geo-Location based QR-Code Authentication Scheme to Defeat Active Real-time Phishing Attack, © 2013, ACM, 11 pages.*
Quincy et al., Performance Prediction of GSM Digital Cellular Speech and Image Transmission, Institute for Telecommunication Sciences, Dept of Commerce, 6 pages.*
Shahzad et al., Secure Unlocking of Mobile Touch Screen Devices by Simple Gestures—You can see but you can not do it, © 2013, ACM, 12 pages.*
International Preliminary Report on Patentability issued in corresponding International Application No. PCT/US2014/025992, dated Sep. 15, 2015.
A M Bakshi, "Speaker Recognition with Statistical Analysis Method," 2011, ACM, 3 pages.
Conti et al., "Transparently Authenticating the User of a Smartphone when Answering or Placing a Call, 2011," University Amsterdam, 12 pages.
Idrissa et al., "Secure Protocols for Serverless Remote Product Authentication," 2010, Scottsdale AZ, 7 pages.
Vapen et al., "2-clickAuth—Optical Challenge-Response Authentication," 2010 IEEE, Sweden, 8 pages.
Weiss et al., "Identifying User Traits by Mining Smart Phone Accelerometer Data," 2011, San Diego, CA, 9 pages.
2010 IEEE International Conference on Signal Processing, Communications and Computing, 2012, Hong Kong, 53 pages.
International Search Report and Written Opinion issued in corresponding International Application No. PCT/US2014/025992, dated Jul. 3, 2014.
International Preliminary Report on Patentability issued in corresponding International Application No. PCT/US2014/25992, dated Sep. 24, 2015.

* cited by examiner

SYSTEMS AND METHODS FOR USING IMAGING TO AUTHENTICATE ONLINE USERS

CROSS-REFERENCE TO RELATED APPLICATION

This application is a continuation of U.S. application Ser. No. 13/840,839, filed Mar. 15, 2013, now U.S. Pat. No. 9,130,929, which is hereby incorporated herein by reference in its entirety.

TECHNICAL FIELD

Various embodiments of the present disclosure relate generally to authenticating users of Internet web pages. More specifically, exemplary embodiments of the present disclosure relate to systems and methods for authenticating users of Internet web pages using imaging techniques.

BACKGROUND

Online identity and password management has plagued users and online companies since the dawn of the Internet. Users find it onerous to remember different passwords for their online accounts on different websites. As a result, many users use the same password for many different websites, making themselves especially vulnerable to hacking and password phishing scams. To thwart this vulnerability, many online websites require users to increase the complexity of their passwords by using non-alpha-numeric characters, and/or by requiring users to substantially change their password at regular intervals. However, these requirements make it even harder for users to remember their own passwords, causing some users to write their passwords down next to their electronic devices, or store emails or documents containing lists of passwords. Often, users lose or fail to recall their password, and must re-set their password using some combination of a verified e-mail address and/or security questions. In some cases, users have to go so far as to call the online company to attempt to prove their identity to gain access to their online account.

One attempt to mitigate the disadvantages of traditional passwords involves the use of so-called "two-step verification," which leverages the use of some physical key carried by a user. For example, many known methods involve the use of a pocket-sized authentication token which is carried by the user and displays a changing passcode on an LCD or e-ink display, which must be typed in at an authentication screen. The number is typically derived from a shared secret by a cryptographic process that makes it infeasible to work out the secret from the sequence of numbers, e.g., using a hash or other cryptography combined with a challenge. The same process repeated on the authentication server will yield the same result if the correct secret was used. The challenge can be either "sequence-based," where the token has a button that is pressed to switch it on and display a new pass code, or "time-based," where the absolute time is used as the challenge and a new pass code is displayed every 30 or 60 seconds. However, the use of such tokens is highly complex and yet still vulnerable to so-called "man-in-the-middle attacks" because they are physically disconnected from the authenticating entity.

Another technique for two-step authentication involves receiving a username and password from a user, and then sending, e.g., by SMS, a unique code to the user through a linked device, such as a mobile phone. The user receives the unique code at the mobile phone, and types it into the website to prove that the user has possession of the device, and is therefore likely the user associated with the previously input credentials. These traditional techniques for managing passwords and implementing two-step authentication involve a number of disadvantages. First of all, they all still rely heavily on the use of a password, which is vulnerable to keylogging, hacking, and phishing scams. Next, passwords that are lost, forgotten, or compromised must typically be replaced using techniques that are both onerous for the associated online company (e.g., requiring call centers, professional IT involvement, etc.) and risky for the user because password reset techniques, like security questions, are often vulnerable to guessing and publicly available data.

Accordingly, a need exists for systems and methods for authenticating users without using passwords. More generally, a need exists for systems and methods for authenticating users of Internet web pages using imaging techniques.

SUMMARY OF THE DISCLOSURE

According to certain embodiments, methods are disclosed for authenticating an identity of an online user. One method includes receiving from the user, through a first device, a request to access a web page associated with the user's online account; transmitting to the user an image that contains a unique ID and a URL of an authentication server; and receiving from the user, through the first device, an authentication request containing the unique ID. The method also includes receiving from the user, through a second device, a log-in ID associated with the user and the unique ID; and authenticating the identity of the user to grant the user access, through the first device, to the web page associated with the user's online account.

According to certain embodiments, systems are disclosed for authenticating an identity of an online user. One system includes a data storage device storing instructions for authenticating an identity of an online user; and a processor configured to execute the instructions to perform a method including: receiving from the user, through a first device, a request to access a web page associated with the user's online account; transmitting to the user an image that contains a unique ID and a URL of an authentication server; receiving from the user, through the first device, an authentication request containing the unique ID; receiving from the user, through a second device, a log-in ID associated with the user and the unique ID; and authenticating the identity of the user to grant the user access, through the first device, to the web page associated with the user's online account.

According to certain embodiments, a computer-readable medium is disclosed that, when executed by a computer system, causes the computer system to perform a method for authenticating an identity of an online user, the method including: receiving from the user, through a first device, a request to access a web page associated with the user's online account; transmitting to the user an image that contains a unique ID and a URL of an authentication server; receiving from the user, through the first device, an authentication request containing the unique ID; receiving from the user, through a second device, a log-in ID associated with the user and the unique ID; and authenticating the identity of the user to grant the user access, through the first device, to the web page associated with the user's online account.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes passwordless authentication as one solution to traditional web authentication. Specifically, as opposed to using passwords, users may use their ubiquitous smart device, camera phone, or other mobile device, as an authentication key when accessing a website. In one embodiment, instead of username and password entry fields, the user may be presented with a unique image when they visit a log-in site that traditionally requested entry of the username and password. The user may then use a mobile application installed on their device to detect and read the content of the unique image code being presented, e.g., using the device's camera. The user's device may be bound to the authentication service, such as with a client certificate. Thus, the session and URL data gathered from the unique image code, in combination with the user identity and digital signature from the bound device, may be sent as an authentication request to an authentication service. The user may then be seamlessly signed on. In one embodiment, binding and/or unbinding devices and authenticating in the case of a stolen or lost device may be handled through a biometric method, such as with a voice recognition system (e.g., interactive voice response "IVR"), using voice data collected at the time of the initial setup. Embodiments of the present disclosure will now be described with respect to FIGS. 1-6.

Figure 1:
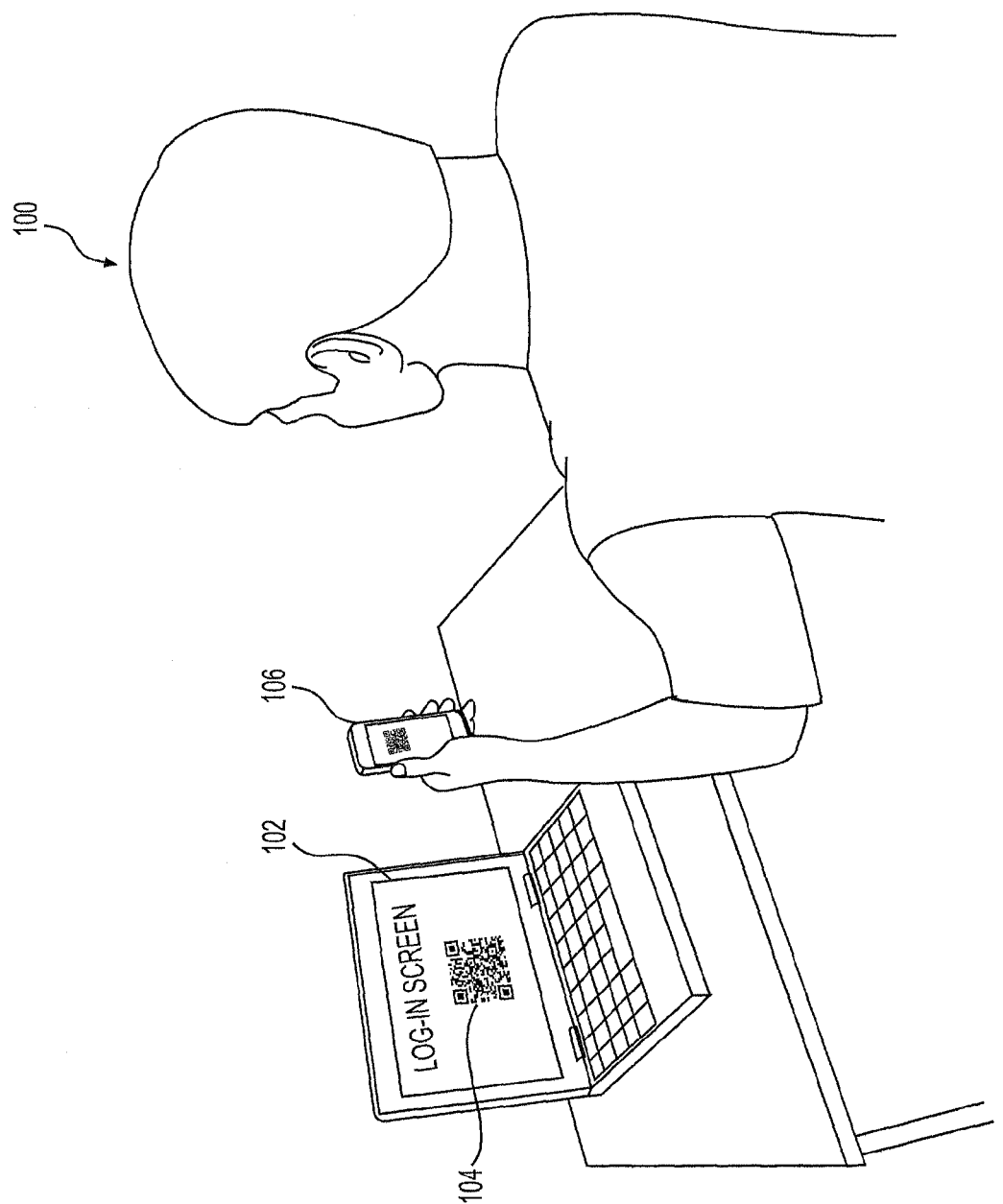
FIG. 1 is an illustration of a user authenticating through a web page using imaging techniques, according to an exemplary embodiment of the present disclosure.

FIG. 1 is an illustration of a user authenticating through a web page using imaging techniques, according to an exemplary embodiment of the present disclosure. As shown in FIG. 1, a user 100 may visit a website or web page 102 that requires a user to sign-in or otherwise have his or her identity authenticated before gaining access, for example, to an online account. For example, a user may be trying to gain access to an online account associated with an online portal, e-mail service, e-commerce site, document management site, content site, or any other website involving a user logging-in.

In accordance with one embodiment, the website or web page 102 may display a unique image 104, which contains stored therein one or more elements of data that the user can obtain to log-in to the website. As shown in FIG. 1, in one embodiment, the user 100 may use a device 106 to capture, read, and/or analyze image 104. In one embodiment, device 106 may be a camera, camera-phone, smartphone, tablet device, or any other mobile or handheld device configured to generate an image of image 104. For example, device 106 may be a camera having a Wi-Fi, cellular, or other wired or wireless connection to the Internet. Thus, device 106 may be configured to receive data stored in image 104 and use it to obtain access to website 102 by communicating the received data over the Internet.

The website 102 may be displayed by a browser installed on a device that is or is not owned by the user 100. For example, the device displaying website 102 may be the user's personal desktop or laptop computer. Alternatively, the device may be a public computer, such as a library or coffee shop computer, a public kiosk, a travel kiosk, a vending machine, or any other type of user terminal connected to the Internet. In one embodiment, the presently disclosed systems and methods are applicable to accessing more than just a website. Rather, the disclosed embodiments may be implemented to enable users to gain access to any type of virtual or physical space. For example, the present embodiments may be used to control access to an automobile, a home, an office, a laboratory, a vault, or any other physical space. Specifically, the device displaying website 102 in FIG. 1 may be incorporated into a physical access control device, such as in a display screen on or next to a door or fence. In addition or alternatively, the device displaying website 102 may be a point-of-sale terminal, which may display a data-rich image consistent with the presently disclosed embodiments, either through a browser or simply a display. Thus, users may be prompted to use their mobile device 106 to photograph, read, or analyze an image 104 displayed next to the physical access control device, to perform authentication and be granted access to the controlled physical space. It will be appreciated that the presently disclosed embodiments may be incorporated in controlling access to literally any type of physical or virtual space, or to perform identify authentication in any desired context.

Certain embodiments disclosed herein may refer to image 104 as an x-bar code. However, it will be appreciated that an "x-bar code" is merely a term used to describe any known type of image configured to store data. In one embodiment, the image 104 may be a barcode, such as a two-dimensional barcode. In one embodiment, image 104 may be a two-dimensional barcode that is a quick response code (i.e., a "QR code"). In addition, device 106 may be a smartphone having installed thereon a mobile application configured to read the QR code of image 104, to facilitate logging user 100 into website 102. In one embodiment, the mobile application may be available at and downloaded from a mobile application "store," which may be a type of e-commerce site where mobile apps can be purchased and downloaded. In one embodiment, the creator and/or distributor of the mobile app may be the same entity that operates an authentication service consistent with the presently disclosed systems and methods.

Figure 2:
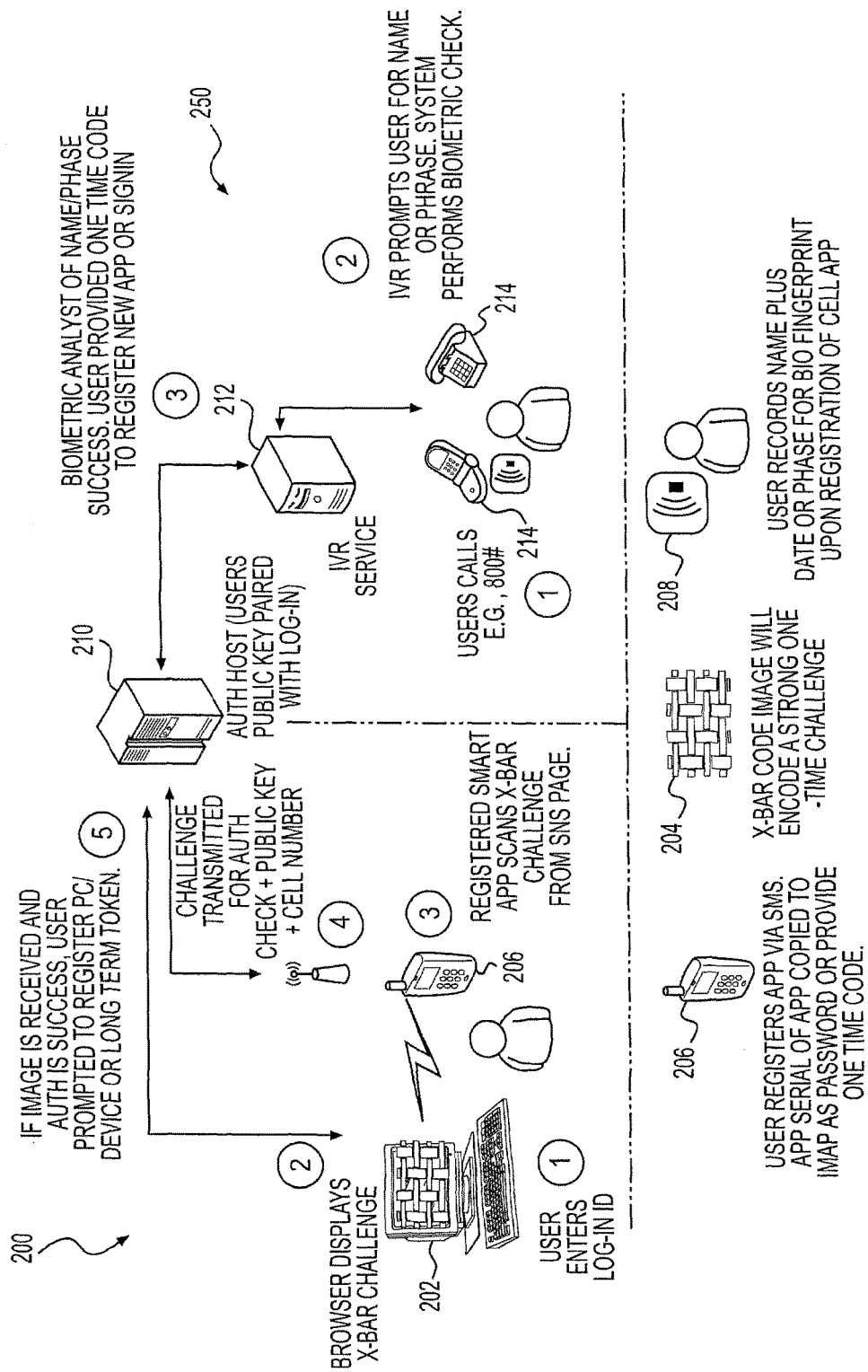
FIG. 2 is a flow diagram of methods for performing online authentication using imaging techniques, according to exemplary embodiments of the present disclosure.

FIG. 2 is a flow diagram of methods for performing online authentication using imaging techniques, according to an exemplary embodiment of the present disclosure. FIG. 2 depicts a method 200 for authenticating a user with a website using imaging, and a method 250 for authenticating a user with the website using biometric analysis. In one embodiment, methods 200 and 250 may involve authenticating through a plurality of mechanisms, including an image, such as x-bar code 204 that is displayed by an authentication service 210 on a log-in page at a computing device 202; a device 206 that is registered to a user with authentication service 210; and a user's voice profile 208 which is registered with one or both of the authentication service 210 and an interactive voice response ("IVR") service 212.

In general, method 200, for authenticating a user with a website using imaging, may include one or more of the following steps. First, a user may visit a log-in page displayed by computing device 202, and optionally, the user's mobile application may transmit a log-in ID (step 1). According to embodiments of the present disclosure, the log-in ID does not have to be entered along with a password, as is typical of many prior authentication systems. The log-in ID may be a username, an e-mail address, a screen name, or any other unique ID, name, or address associated with the user. Based on the user's entered log-in ID, the authentication service 210 may trigger the generation and display of an x-bar code challenge on the log-in page (step 2). Specifically, the x-bar code may be generated in real time based on the entered user log-in ID. The x-bar code may store one or more of, the user log-in ID, an URL associated with the authentication service 210, and a unique ID. As discussed above, the x-bar code may be any type of image that stores data, such as a two-dimensional barcode and/or QR code. The display of the x-bar code on the website may trigger one or more authentication tasks to be performed by authentication service 210, as will be described in more detail below.

The user may, at any time after receiving the x-bar code on the web page, use a registered device to optically scan, photograph, or otherwise image or analyze the x-bar code (step 3). For example, the user may use a registered mobile app (e.g., "smart app") stored on mobile device 206 to scan the x-bar code challenge on the log-in page. In one embodiment, the registered smart app may decode the x-bar code, or otherwise extract data stored in the x-bar code. In one embodiment, the smart app may extract the user's log-in ID, the URL associated with the authentication service 210, and the unique ID that were stored in the x-bar code.

The smart app stored on the user's mobile device 206 may then send the extracted information to authentication service 210 for authentication (step 4). In one embodiment, the smart app may send the extracted information along with a public key and/or the cell number of the device 206. For example, as described in more detail below, the smart app and/or mobile device 206 may employ any desired signed certificate, public/private key, or other authentication technique to send extracted data to the authentication service 210. If authentication service 210 verifies that the smart app and/or mobile device 206 belong to the user associated with the user log-in ID entered in step 1, then authentication service 210 may enable the user to successfully log-in to the account associated with the user's log-in ID (step 5). Thus, the user may be authenticated with respect to the website without the user having to enter a password linked to the user's log-in ID.

In some cases, it may be desirable to authenticate the user without the device 206. For example, in some cases, the user may wish to register a new device 206, the user may have lost their device 206, and/or the user may wish to disable or replace their device 206. Thus, it may be desirable to authenticate a user without relying on passwords even if the user's linked or bound device 206 is unavailable. The presently disclosed systems and methods disclose enabling such authentication using one or more biometric techniques. It will be appreciated that, although the present embodiments are disclosed mainly in relation to voice recognition as a biometric method, the present embodiments of image authentication may be used in relation to any desired biometric mechanism, such as fingerprint scanning, eye (e.g., iris) recognition, DNA matching, heart monitoring, and/or impedance matching. To authenticate the user with the website using voice-type biometric analysis, method 250 may include one or more of the following steps.

In one embodiment, method 250 may include prompting a user to call into an interactive voice response ("IVR") service 212 using any phone 214 (step 1). For example, a user may have accessed a log-in web page without access to the user's bound device 206. The user may have also received a toll-free (e.g., 1-800) number and a unique code on the log-in page. The IVR service 212 may prompt the user to say a name and/or phrase (step 2). For example, IVR service 212 may prompt the user to enter a name and/or phrase that the user previously trained the IVR service 212 to recognize based on the user's voice profile 208. If IVR service 212 or a biometric service associated therewith determines a biometric match between the received name or phrase and the voice profile 208, then IVR service 212 may send an indication of the successful match to authentication service 212 (step 3). Thus, authentication service 210 may enable the user to sign-in to the log-in page and/or register ("bind") or remove ("unbind") a new smart app or device.

Figure 3:
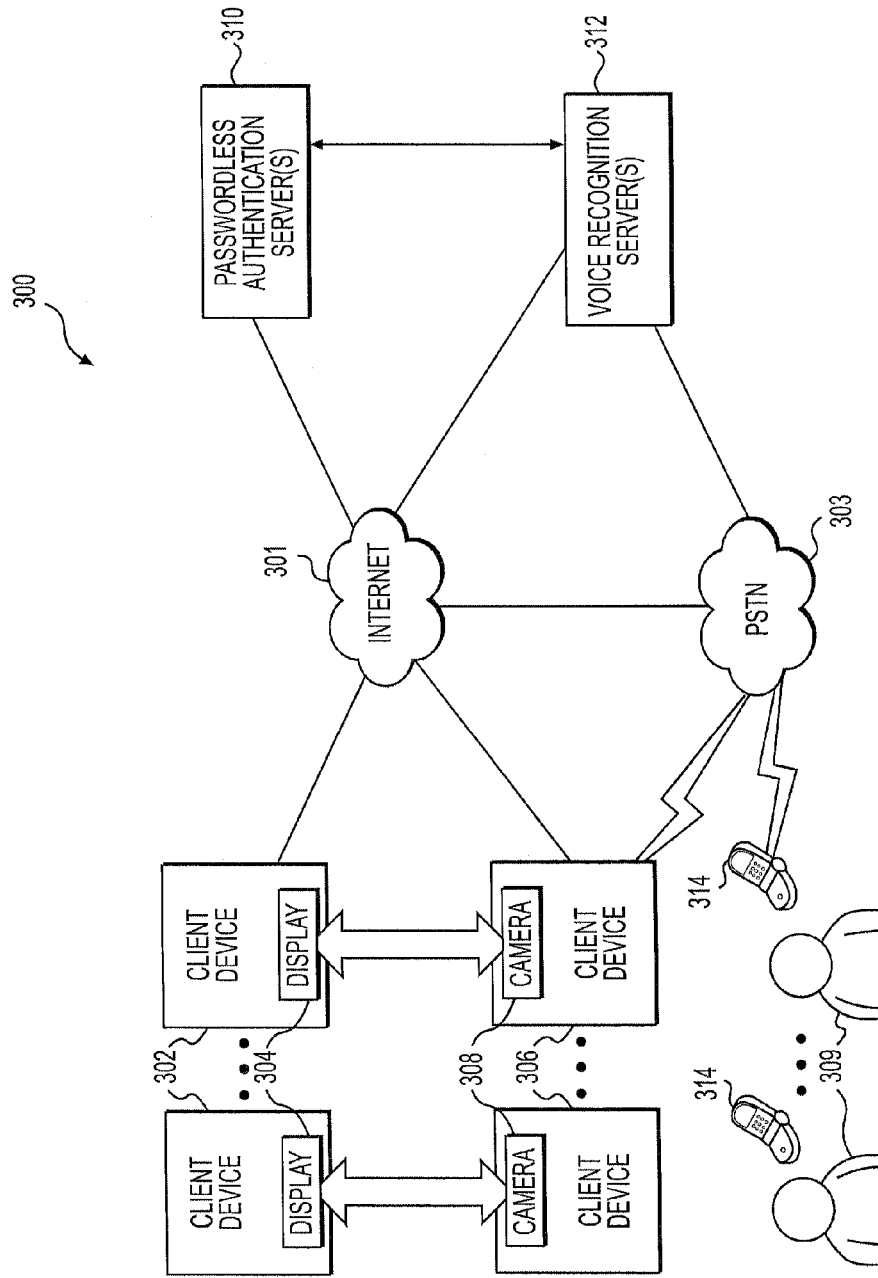
FIG. 3 is a block diagram of an environment and system for performing online authentication using imaging techniques, according to an exemplary embodiment of the present disclosure.

FIG. 3 is a block diagram of an environment and system for performing online authentication using imaging techniques, according to an exemplary embodiment of the present disclosure.

Specifically, FIG. 3 illustrates an exemplary environment including a plurality of client devices 302, 306, passwordless authentication server(s) 310, and voice recognition server(s) 312, all disposed in communication with an electronic network, such as the Internet 301. As shown in FIG. 3, client devices 302, 306 may be arranged as pairs of devices, and each pair of devices may be associated with a respective user 309, and including a device 302 having at least a display 304 and a device 306 having at least a camera 308. In one embodiment, each of client devices 302 may correspond to a computer, such as a personal laptop or desktop computer that displays a challenge image 104, 204, as described above with respect to FIGS. 1 and 2. By contrast, each of client devices 306 may correspond to a mobile or handheld device, such as a smartphone 106, 206, that captures, reads, and/or analyzes one of the images 104, 204, as also described above with respect to FIGS. 1 and 2. In one embodiment, client device 302 may be public and used by any number of users, whereas client device 306, by contrast, may be associated with a specific user and the user's account and/or log-in ID. In this case, client device 302 may be a public kiosk or public computer that is used by any member of the public, whereas client device 306 is a device owned and controlled by a specific individual.

In one embodiment, each of client devices 302 may be connected to the Internet 301, for receiving challenge images (e.g., "x-bar codes" or QR codes) from passwordless authentication server(s) 310. In one embodiment, each of client devices 306 may be connected to the Internet 301 and/or a telephony network 303, such as the public switched telephone network ("PSTN"). Thus, a user 309 may use a client device 306 to send photos of, and/or information extracted from photos of, the images 104, 204 to authentication server(s) 310. User 309 may also use client device 306 or any phone 314 to call into voice recognition server(s) 312, over either or both of Internet 301 and PSTN 303, to perform method 250 for authenticating the user with the website using biometric analysis.

In one embodiment, each pair of client devices 302, 306 may be owned and used by one or more people, who may be viewers of web pages over the Internet, either through a mobile browser or web browser stored on respective client devices. Client devices 302, 306 may include any type of electronic device configured to send and receive data, such as websites and electronic advertisements, over the Internet 301. For example, each of client devices 302, 306 may include a server, kiosk, personal computer, tablet computer, mobile device, smartphone, and/or personal digital assistant ("PDA") disposed in communication with the Internet 301. Each of client devices 302, 306 may have a web browser or mobile browser installed for receiving and displaying web content and/or authentication information from web servers. Thus, each of client devices 302, 306 may be configured to receive and display data that is received from one or more of passwordless authentication server(s) 310, voice recognition server(s) 312, or any other web servers, DNS servers, content distribution network servers, over the Internet 301.

Passwordless authentication server(s) 310 may be configured to interact with web servers and client devices 302 to display challenge images on displays 304 of client devices 302. Passwordless authentication server(s) 310 may be configured to generate challenge images including two-dimensional barcodes or QR codes based on information received from client devices 302. Passwordless authentication server(s) 310 may be configured to receive information from voice recognition server(s) 312 regarding whether a user 309 has successfully authenticated using voice recognition, and then interact with authentication servers and web servers to grant client device 302 access to a website.

Voice recognition server(s) 312 may include any type or combination of servers used in operating an interactive voice response service. Voice recognition server(s) 312 may implement the IVR service using standards such as VoiceXML, CCXML, SRGS, and SSML, or any other XML-driven application that allows associated web servers to act as an application server. The IVR service may be implemented using, e.g., predefined grammars used in "directed" dialogues, and/or statistically trained language models. Moreover, the IVR service may implement both speech recognition techniques to identify words and phrases, and voice recognition techniques (i.e., speaker recognition) to identify speaker-specific speech. In one embodiment, the IVR service may outsource one or both of speech and voice recognition to a service, such as an API of a remote speech or voice recognition service.

Passwordless authentication server(s) 310 and/or voice recognition server(s) 312 may include any type or combination of computing systems, such as clustered computing machines and/or servers. In one embodiment, each of passwordless authentication server(s) 310 and/or voice recognition server(s) 312 may be an assembly of hardware, including a memory, a central processing unit ("CPU"), and/or a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Regardless of specific physical components or layout, one or more of the client devices 302, 306, passwordless authentication server(s) 310 and/or voice recognition server(s) 312, or any other servers or systems associated with environment 300, may be programmed with instructions to perform a method of using imaging to authenticate online users, according to the exemplary methods described with respect to FIGS. 4-6 below.

Figure 4:
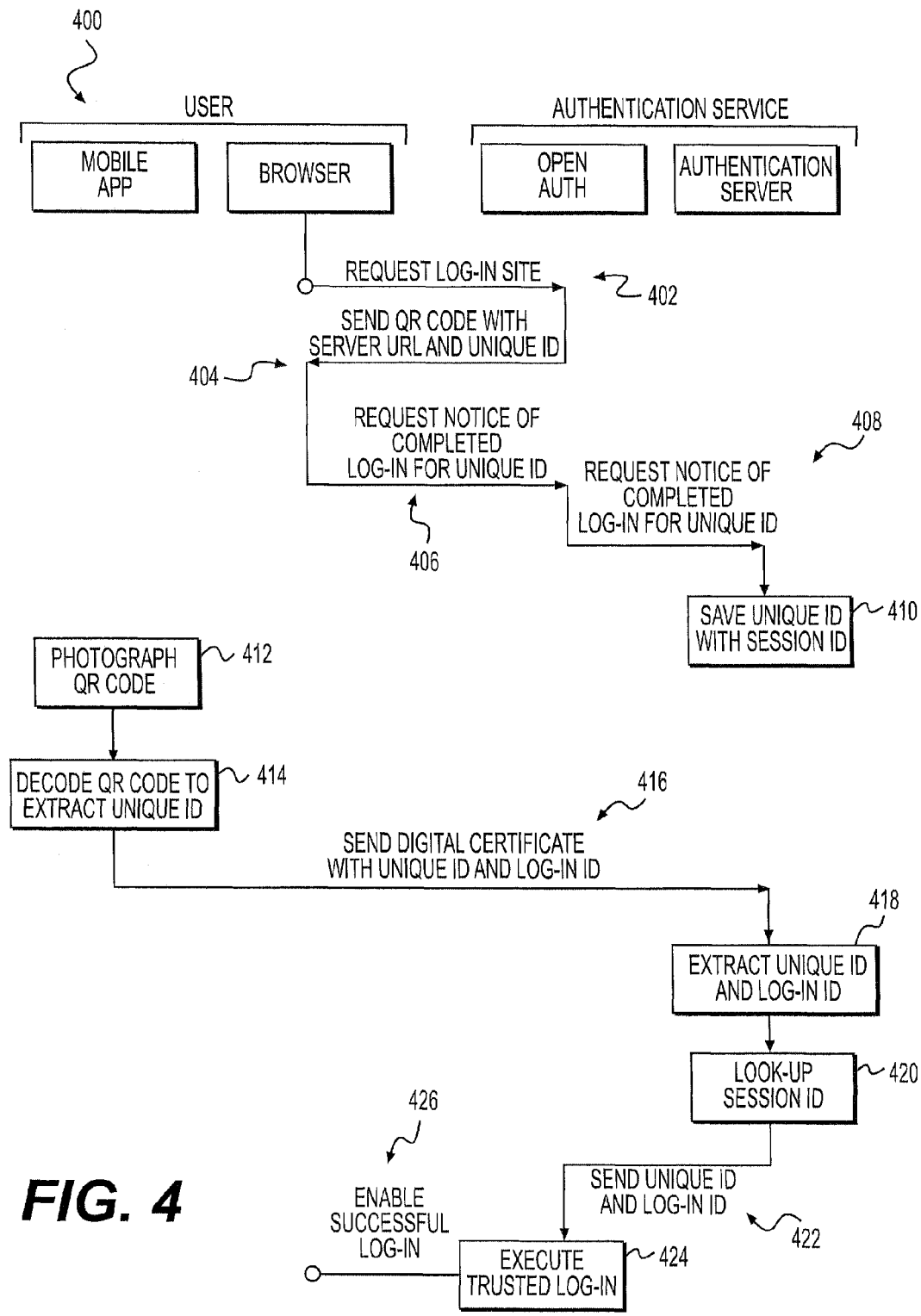
FIG. 4 is a flow diagram of a method for authenticating a user using imaging techniques, according to an exemplary embodiment of the present disclosure.

FIG. 4 is a flow diagram of a method 400 for authenticating a user using imaging techniques, according to an exemplary embodiment of the present disclosure. First, in one embodiment, a user may be interacting with both a browser and a mobile app. For example, the user may be interacting with a browser stored on a computing device, such as the previously described browser 102 or computing devices 202, 302 (FIGS. 1-3). The user may also be interacting with a mobile app stored on a mobile or handheld device, such as the previously described devices 106, 206, 306 (FIGS. 1-3). As discussed above, the user may desire to log-in to a website or, web page presented by a browser of the computing device. Thus, the user may initiate method 400 by requesting to view a log-in site (step 402). For example, the user may request to view an e-mail account, e-commerce account, etc. as discussed above. The user's request may be received by an authentication service, which in certain embodiments may include so-called "open auth" servers and authentication servers consistent with the presently disclosed systems and methods. In one embodiment, the open authorization protocol managed by the OAuth organization may be used as an open source public/private key authentication service in combination with the presently disclosed systems and methods.

In response to the user's request, the authentication service may then generate a unique ID and send the user's browser a QR code containing a server URL and the generated unique ID (step 404). As discussed above, although the presently disclosed methods are described with respect to a QR code, any other type of data-storing image may be used, such as any other type of two-dimensional barcode or x-bar code. In one embodiment, the QR code may contain the URL associated with the authentication server, to inform the browser where to request notice of a log-in completed by the user's mobile device. Thus, upon the browser displaying the received QR code, the browser may execute any suitable type of process to request notice of a log-in completed by the user's mobile device (step 406). In one embodiment, the browser may execute JavaScript code to make an open-ended AJAX request to the authorization service. In other words, the browser, after informing the authorization service that it has displayed the QR code and requesting validation of user identity, may simply wait until a response is received from the authentication service. In one embodiment, the request for notice of a completed log-in may be sent to one or more open auth servers and/or authentication servers (steps 406, 408). While step 406 may involve the user's browser literally requesting notice of completed log-in for the unique ID, in function, the request may be considered, and referred to as, a request by the user for authentication. The authentication servers may then save the generated unique ID, which was sent to the browser in the QR code, along with a session ID that identifies the pending request by the browser to receive notice of completed log-in (step 410). Thus, in one embodiment, the authorization service may store in a database, a plurality of unique IDs and session IDs received from various users' browsers, with the data indexed by the unique IDs.

At any time after the QR code was displayed on the web page, the user may be able to photograph, read, or analyze the QR code (step 412), such as by using a mobile app or QR code reader stored on the user's mobile or handheld device. For example, the user may point a camera or other sensor of a linked smartphone or mobile device at the QR code displayed by the browser (as illustrated in FIG. 1). The user may then decode the QR code to extract the unique ID stored in the code (step 414). In one embodiment, a mobile app stored on the user's mobile device may automatically read the QR code, extract the stored unique ID, and send the unique ID to the authorization service. In one embodiment, the mobile application may send to the authentication server a digital certificate containing the extracted unique ID and the log-in ID associated with the user (step 416). Specifically, because the mobile app may have been pre-registered with the authentication service, the mobile app may have one or more public/private keys, tokens, or any other authentication file suitable to securely transmit the encoded unique ID and log-in ID to the authentication service. In one embodiment, a client certificate associated with the user's device or mobile application may associate the user's log-in ID with the public key received from a certificate authority configured in the authentication service.

Upon receiving the digital certificate from the mobile app, the authentication service may extract the unique ID from the browser's request from step 406, and extract the user's log-in ID from the digital certificate (step 418). The authentication service may then look-up the session ID for which the extracted unique ID was saved (step 420). Specifically, at this point, the authentication service may have any number of pending requests from browsers that are currently displaying QR codes and prompting respective users to capture the QR codes with a mobile device for authentication. Thus, the authentication service may, having received a digital certificate and enclosed unique ID and log-in ID, desire to identify the browser session corresponding to that unique ID. That is, the authentication service may determine which browser issued a pending request for notice of completed log-in associated with the log-in ID that it now received from a mobile device. Accordingly, authentication service may use the unique ID to look up the session ID stored in step 410. The authentication service may then send to the open auth servers a request to log-in the user associated with the looked-up browser session, by sending the unique ID and log-in ID to the open auth servers (step 422).

The open auth servers may then execute a trusted log-in of the user associated with the pending browser session (step 424), and enable the user interacting with the browser to successfully log-in to the requested account (step 426). In one embodiment, the open auth servers may allow JavaScript at the user's browser to gain control of the session (pending per the original AJAX request) and simulate a successful log-in, such as by emulating the log-in experience a user would have from entering a matching username and password.

Figure 5:
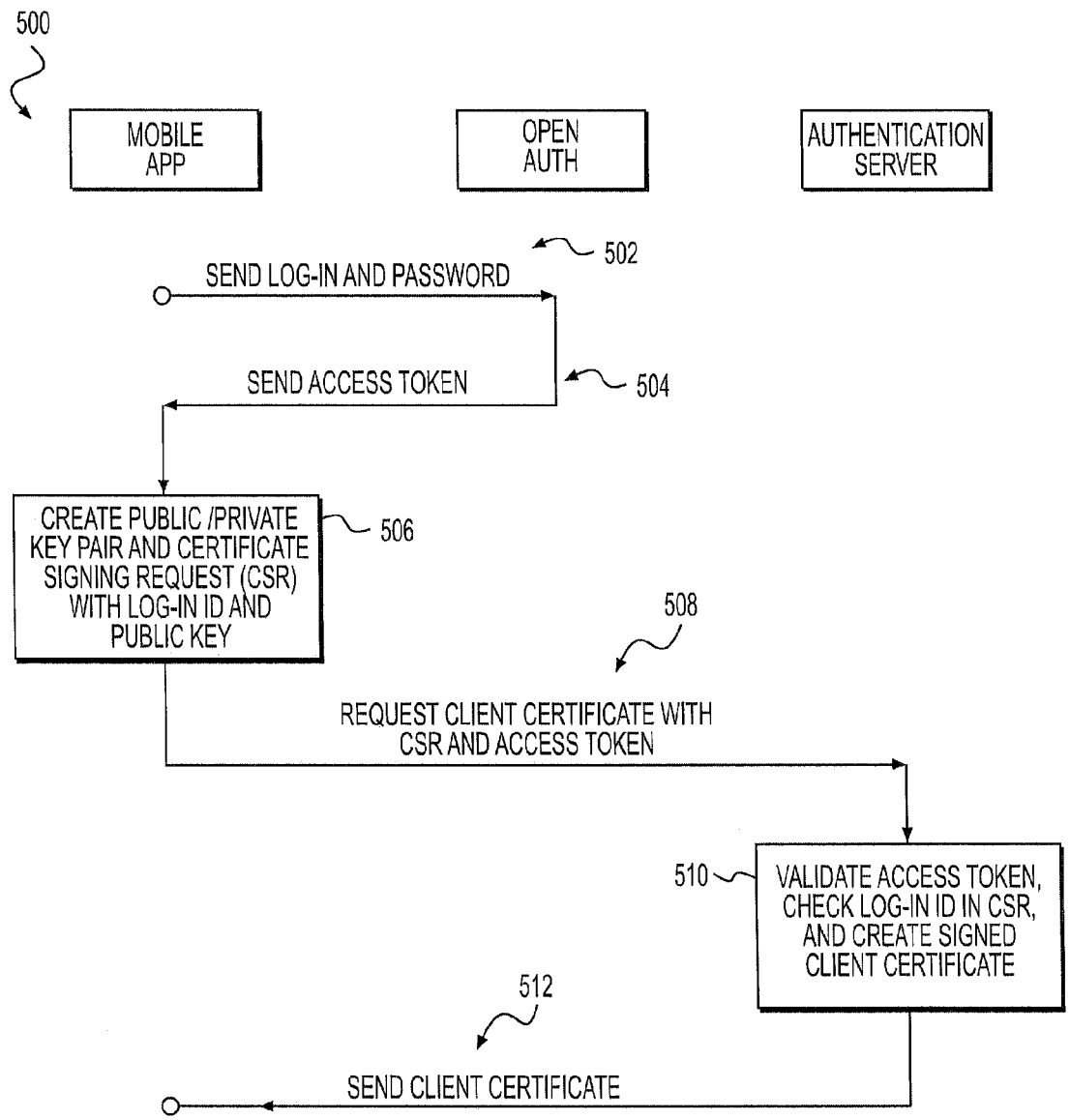
FIG. 5 is a flow diagram of a method for associating a user device with a method for authenticating a user using imaging techniques, according to an exemplary embodiment of the present disclosure.

FIG. 5 is a flow diagram of a method 500 for associating a user device with a method for authenticating a user using imaging techniques, according to an exemplary embodiment of the present disclosure. As discussed above, a mobile app of a user's mobile device may store a digital certificate, or client certificate, to enable trusted transmission of the unique ID to the authentication service. Method 500 describes one exemplary method 500 for storing a client certificate on the user's device, based on validation by the authentication service.

As shown in FIG. 5, method 500 may first include a user sending, through a mobile app, a log-in and password to one or more open auth servers (step 502). The user may also be required to provide proof of identity through an SMS message, or additional credentials associated with an existing account. In one embodiment, the mobile app may invoke the OAUTH 2.0 resource owner password credential ("ROPC") flow with the user's log-in ID and password to obtain an access token. The open auth servers may then send an access token back to the user's mobile app (step 504). In one embodiment, the user's submission of a password to the open auth servers, whether through an app store or the website, may involve the final time that a user is required to submit a password to the authentication service before fully converting to a scheme of passwordless authentication (e.g., using imaging and biometric methods 200, 250).

The mobile app may then create a public/private key pair and certificate signing request ("CSR") with the user's log-in ID and the public key (step 506). The mobile app may save the private key, and bind the log-in ID with the public key. The mobile app may then send the authentication server a request for a client certificate by passing, to the authentication server, the CSR and access token received from the open auth servers (step 508). The authentication server may then validate the access token, check the log-in ID sent in the CSR, and create a signed client certificate (step 510). In one embodiment, the client certificate may be produced from the CSR signed with the private key for the certificate authority associated with the authentication server. Finally, the authentication server may send the user's mobile app the signed client certificate (step 512), for use in transmitting unique IDs extracted from QR codes to the authentication service, as described with respect to step 416 of FIG. 4.

Figure 6:
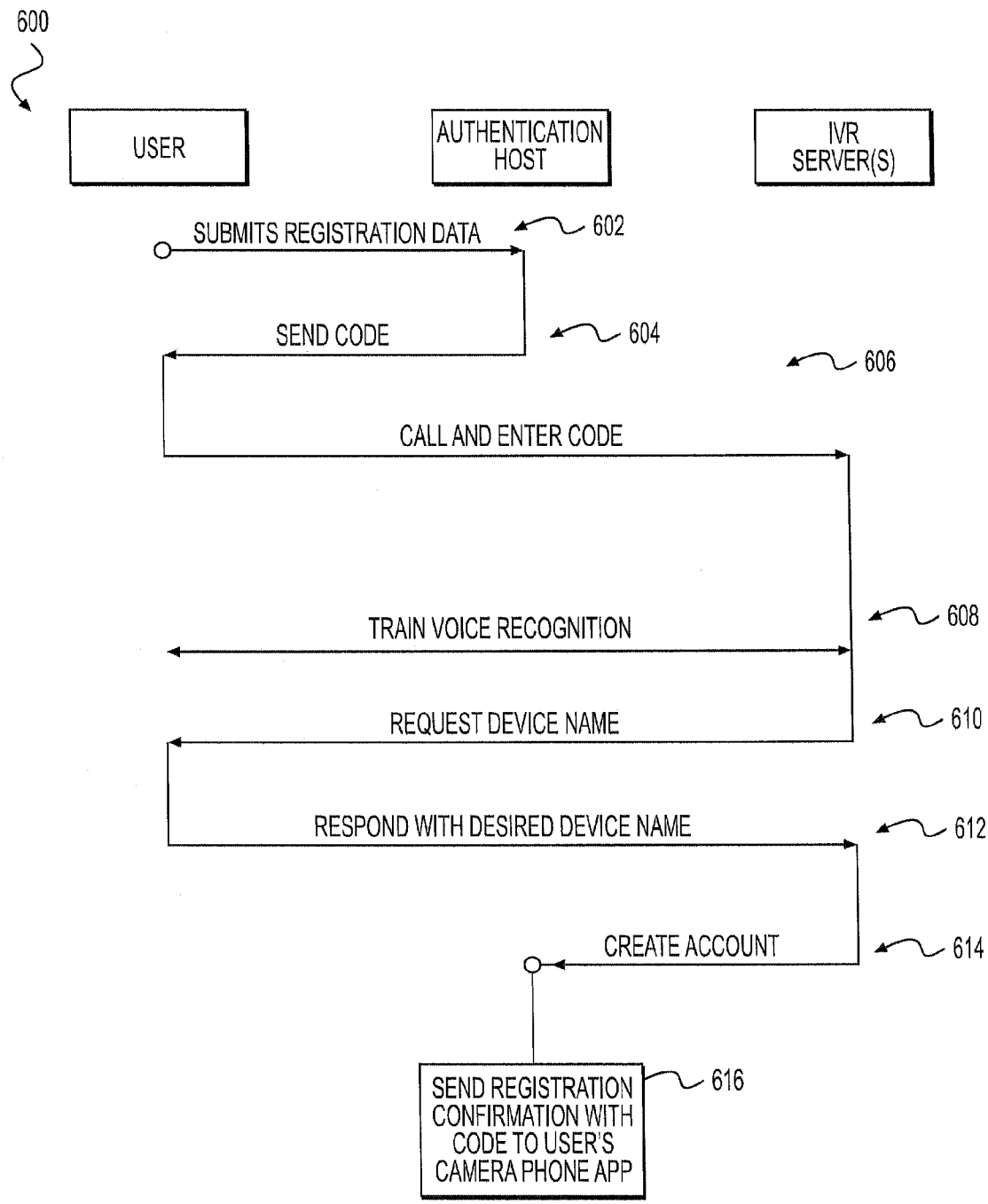
FIG. 6 is a flow diagram of a method for associating user biometric data with a method for authenticating a user using imaging techniques, according to an exemplary embodiment of the present disclosure.

FIG. 6 is a flow diagram of a method 600 for associating user biometric data with a method for authenticating a user, according to an exemplary embodiment of the present disclosure. As described above, in some cases, it may be desirable to authenticate a user without a password even when the user's linked or bound device is unavailable. For example, the user may desire to bind a new device, or the user's bound device may be missing, and the user may desire to unbind a previously bound device. Accordingly, when a user initially binds a device with a passwordless authentication method according to method 500 of FIG. 5, the user may also be prompted to initialize a voice recognition or other biometric parameter for use in authentication in those events of a user lacking the bound device.

As shown in FIG. 6, method 600 may include a user submitting registration data to an authentication host (step 602). For example, the user may visit a website that the user desires to log-in to using imaging method 200 and biometric method 250. Alternatively, the user may visit an application store from which the mobile app may be downloaded. In one embodiment, the user's submission of registration data to the host, whether through an app store or the website, may involve the final time that a user is required to submit a password to the authentication service before fully converting to a scheme of passwordless authentication (e.g., using imaging and biometric methods 200, 250). The authentication host may then send the user a unique code (step 604). The user may then dial-in to a number associated with the authentication service, or an associated voice recognition service, and enter the code provided by the authentication host (step 606). For example, in one embodiment, the user may dial a toll-free (e.g., 1-800) number that connects the user to, e.g., one or more servers associated with the interactive voice response (IVR) service. In one embodiment, the IVR servers may initiate a voice recognition training session with the user (step 608). For example, the IVR server(s) may instruct the user to say one more words or phrases, and/or to answer one or more security questions, using the user's natural speaking voice. The IVR server may ask the user to specify a device name to be associated with the user's bound device (step 610), and the user may respond with a desired device name (step 612). The IVR server(s) may then create an account associated with one or more of the user's device, the mobile application on the user's device, the user's log-in ID, the device name, and one or more verbal responses provided by the user during training step 608 (step 614). Finally, method 600 may include sending a registration confirmation including the provided unique code to the user's mobile app (step 616).

In one embodiment, a user may have already bound one device, through a mobile app on the device, to the user's log-in information through authentication service. However, the user may wish to bind an additional device to the user's log-in information. In such an embodiment, the user may download another instance of the mobile device to the additional device. The user may then request to bind the mobile application of the additional device to the user's account. The mobile application of the additional device may display a QR code, consistent with the above-described methods. The user may then image the displayed QR code using the already bound device. The already bound device may decode the QR code displayed on the additional device, and send the extracted information, including for example a unique ID, to the authentication service in a client certificate, also consistent with the above-described methods. Thus, the authentication service may determine that the additional device is under the control of the user of the authenticated bound device, and thereafter bind the additional device, such as by sending it a signed client certificate consistent with the methods described above with respect to the already bound device.

The presently disclosed techniques may be applicable to granting access to any type of credentials or virtual or physical space. While the embodiments above are described mainly in relation to authenticating users for granting access to a web page, such as an online account, the access may be granted for any other suitable purpose. For example, in one embodiment, a user may use a second device to image a displayed x-bar code or other image for purposes of authorizing a payment. In other words, a computer, point-of-sale-terminal, kiosk, or vending machine may display an image challenge (similar to that of device 102 discussed above). A user may then scan or take a photograph of the image using his or her personal device having a token or digital certificate stored on it. When the user's device sends appropriate information containing both collected image data and user data stored on the device, e.g., according to the methods described above, then the user may authorize the device that displayed the image challenge to execute a payment transaction, such as a payment involving the user's bank account or credit card account. This may be enabled by the user providing credit card and billing information at the time of registering or binding a device for use in scanning or imaging challenge images.

In another embodiment of the present disclosure, alternatives to imaging may be used to exchange unique IDs, user IDs, and browser IDs between a user's computer, mobile device, and one or more authentication servers. For example, any of those ID numbers may be transmitted through a radio frequency ID (RFID) device or through a magnetic card reader. In other words, a person may carry a magnetic card and/or an RFID chip, which, within a proximity of the person's device, may be recognized by the user's device as containing a user ID number and/or a unique ID number that can be authenticated between a user's computer and one or more back-end authentication servers.

In yet another embodiment, an image challenge consistent with the presently disclosed systems and methods may be displayed by any website associated with the entity providing an application on the user's personal device, or even an affiliate, such as a related website. Thus, in one embodiment, a user may store passwords for any number of different websites in relation to an account of the user's authenticating device 106. Accordingly, when the user visits any linked website, the user may scan or image a challenge image, instead of entering a password, as long as the website and password are stored in advance in relation to the user's barcode scanning application. As a result, the user may use their device and image scanning application as a sort of password manager for using their various credentials around the Internet, without having to store all of those passwords within a single master password.

Passwordless authentication may advantageously frustrate conventional methods used by hackers to obtain users' credentials. Brute force attacks, social engineering, phishing and keylogging may become ineffective against the disclosed embodiments of authenticating with imaging from a mobile device. As a result, the disclosed embodiments for passwordless authentication may offer significant value to online companies and their customers, and the online industry as a whole. The disclosed embodiments may reduce the amount of resources allocated to fighting hackers and protecting customers, not to mention money spent on call centers used for account recovery purposes. Additionally, disclosed embodiments may provide online customers with an improved level of security and ease of use. Passwordless authentication may drive revenue indirectly in the form of cost savings, member retention, and member acquisition. Compromised account detection and recovery efforts may also be significantly reduced. Finally, the presently disclosed embodiments may results in increased product engagement from existing members, and new member acquisition by creating a more valuable product.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for authenticating an identity of an online user, the method including:
   receiving registration data of an online user, wherein the registration data is used to access a web page associated with the online user;
   receiving, from a registration device, a request to access the web page associated with the online user;
   transmitting, by an authentication server, in response to the request to access the web page from the registration device, an image that contains a unique identifier ("ID") and a uniform resource locator ("URL") of the authentication server;
   storing, by the authentication server, the unique ID in association with a session identifier ("ID") and the registration data of the online user;
   receiving, at the authentication server from the online user through a first device, an authentication request containing a digital certificate, the unique ID and a log-in identifier ("ID");
   authenticating, by the authentication server, the first device of the online user based on the digital certificate, the unique ID and log-in ID;
   associating the first device of the online user with the session ID stored in association with the registration data of the online user when the first user device is authenticated;
   transmitting the web page associated with the online user to the first user device when the first user device is authenticated, the requested web page including an access number and a unique authentication code associated with the registration data of the online user;
   receiving, at a voice recognition server associated with the access number, the unique authentication code associated with the registration data of the online user;
   receiving, at the voice recognition server, a voice sample of the online user for authenticating the online user based on biometric matching, wherein the biometric matching uses predefined grammar in directed dialogues and includes both speech recognition and voice recognition; and
   associating the voice sample of the online user with the registration data of the online user,
   wherein the voice sample of the online user for authenticating the user based on biometric matching is received through one of an Internet connection and a public switched telephone network connection.

2. The method of claim 1, wherein the registration device is one of a personal computer, a public computer, and a public kiosk, and the first device is a mobile device.

3. The method of claim 1, wherein the image is a two-dimensional barcode or a quick response code.

4. The method of claim 1, wherein the authentication request containing the unique ID is received upon the online user requesting the URL of the authentication server, and includes a request for notice of completed log-in for the unique ID.

5. The method of claim 1, further comprising:
   providing the online user with a mobile application enabling the online user to extract the unique ID from the image, by taking a picture of a display of the registration device using a camera of the first device.

6. The method of claim 1, further comprising:
   storing, upon receiving the authentication request containing the unique ID, the unique ID in relation to a browser session ID of the registration device.

7. The method of claim 6, further comprising:
   looking up the browser session ID of the registration device based on the unique ID received from the user through the first device.

8. The method of claim 1, further comprising:
   sending the first device one of the digital certificate and access token storing a log-in ID of the online user.

9. The method of claim 8, wherein the log-in ID of the online user and the unique ID are received from the online user within one of the digital certificate and access token.

10. A system for authenticating an identity of an online user, the system including:
    a data storage device for storing instructions for authenticating an identity of an online user; and
    a processor configured to execute the instructions to perform a method including:
      receiving registration data of an online user, wherein the registration data is used to access a web page associated with the online user;
      receiving, from a registration device, a request to access the web page associated with the online user;
      transmitting, by an authentication server, in response to the request to access the web page from the registration device, an image that contains a unique identifier ("ID") and a uniform resource locator ("URL") of the authentication server;
      storing, by the authentication server, the unique ID in association with a session identifier ("ID") and the registration data of the online user;
      receiving, at the authentication server from the online user through a first device, an authentication request containing a digital certificate, the unique ID and a log-in identifier ("ID");
      authenticating, by the authentication server, the first device of the online user based on the digital certificate, the unique ID and the log-in ID;
      associating the first device of the online user with the session ID stored in association with the registration data of the online user when the first user device is authenticated;
      transmitting the web page associated with the online user to the first user device when the first user device is authenticated, the requested web page including an access number and a unique authentication code associated with the registration data of the online user;
      receiving, at a voice recognition server associated with the access number, the unique authentication code associated with the registration data of the online user;
      receiving, at the voice recognition server, a voice sample of the online user for authenticating the online user based on biometric matching, wherein the biometric matching uses predefined grammar in directed dialogues and includes both speech recognition and voice recognition; and
      associating the voice sample of the online user with the registration data of the online user,
      wherein the voice sample of the online user for authenticating the user based on biometric matching is received through one of an Internet connection and a public switched telephone network connection.

11. The system of claim 10, wherein the registration device is one of a personal computer, a public computer, and a public kiosk, and the first device is a mobile device.

12. The system of claim 10, wherein the image is a two-dimensional barcode or a quick response code.

13. The system of claim 10, wherein the authentication request containing the unique ID is received upon the online user requesting the URL of the authentication server, and includes a request for notice of completed log-in for the unique ID.

14. The system of claim 10, wherein the processor is further configured to execute the instructions to perform the method including:
providing the online user with a mobile application enabling the online user to extract the unique ID from the image, by taking a picture of a display of the registration device using a camera of the first device.

15. The system of claim 10, wherein the processor is further configured to execute the instructions to perform the method including:
storing, upon receiving the authentication request containing the unique ID, the unique ID in relation to a browser session ID of the registration device.

16. The system of claim 15, wherein the processor is further configured to execute the instructions to perform the method including:
looking up the browser session ID of the registration device based on the unique ID received from the user through the first device.

17. The system of claim 10, wherein the processor is further configured to execute the instructions to perform the method including:
sending the first device one of the digital certificate and access token storing a log-in ID of the online user.

18. The system of claim 17, wherein the log-in ID of the online user and the unique ID are received from the online user within one of the digital certificate and access token.

19. A non-transitory computer-readable storage medium that, when executed by a computer system, cause the computer system to perform a method for authenticating an identity of an online user, the method including:
receiving registration data of an online user, wherein the registration data is used to access a web page associated with the online user;
receiving, from a registration device, a request to access the web page associated with the online user;
transmitting, by an authentication server, in response to the request to access the web page from the registration device, an image that contains a unique identifier ("ID") and a uniform resource locator ("URL") of the authentication server;
storing, by the authentication server, the unique ID in association with a session identifier ("ID") and the registration data of the online user;
receiving, at the authentication server from the online user through a first device, an authentication request containing a digital certificate, the unique ID and a log-in identifier ("ID");
authenticating, by the authentication server, the first device of the online user based on the digital certificate, the unique ID and the log-in ID;
associating the first device of the online user with the session ID stored in association with the registration data of the online user when the first user device is authenticated;
transmitting the web page associated with the online user to the first user device when the first user device is authenticated, the requested web page including an access number and a unique authentication code associated with the registration data of the online user;
receiving, at a voice recognition server associated with the access number, the unique authentication code associated with the registration data of the online user;
receiving, at the voice recognition server, a voice sample of the online user for authenticating the online user based on biometric matching, wherein the biometric matching uses predefined grammar in directed dialogues and includes both speech recognition and voice recognition; and
associating the voice sample of the online user with the registration data of the online user,
wherein the voice sample of the online user for authenticating the user based on biometric matching is received through one of an Internet connection and a public switched telephone network connection.

* * * * *